Patented Aug. 15, 1950

2,518,442

UNITED STATES PATENT OFFICE 2,518,442

PLASTICIZED VINYLIDENE CHLORIDE COPOLYMERS

Robert Albert Scheiderbauer, Waynesboro, Va., assignor to E. I. du Pont de Nemours & Company, Wilmington, Del., a corporation of Delaware No Drawing. Application December 21, 1946, Serial No. 717,815

8 Claims. (Cl. 260—30.4)

This invention relates to vinylidene chloride copolymer structures. More particularly it relates to pellicular structures of plasticized vinylidene chloride-copolymers.

A principal object of this invention is to provide pellicular structures of vinylidene chloride copolymers characterized by enhanced flexibility, toughness and durability.

Another object is to provide plasticized films and coatings of vinylidene chloride copolymer.

A further object is to enhance the flexibility, durability, and toughness of transparent sheets, films, coating, and similar structures of vinylidene chloride copolymers without impairing the clarity thereof.

A still further object is to provide vinylidene chloride-acrylonitrile copolymer structures of improved flexibility, durability and toughness. These and other objects will more clearly appear hereinafter.

The above objects are obtained by incorporating, as plasticizer, in vinylidene chloride copolymer structures, a polyoxyalkylene ether of a hexitol ring dehydration product.

When hexitols are dehydrated, they generally result in a mixture of ring compounds, namely hexides and hexitans, which can be separated by fractional crystallization or extractions. For example, the removal of one molecule of water from sorbitol gives rise to the formation of sorbides of the formulae:

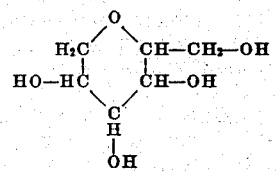

and

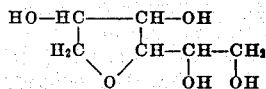

and the removal of a further molecule of water yields sorbitan:

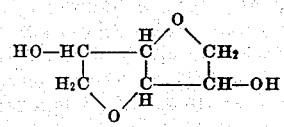

The polyoxyalkylene ethers contemplated by this invention comprise the hexitol dehydration products, i. e., hexitans and hexides, which have at least one hydroxyl group replaced by a polyoxyalkylene radical and which may further contain at least one lipophilic radical taken from the group consisting of long chain aliphatic hydrocarbon radicals and long chain aliphatic monocarboxylic acid ester groups e. g., of 8 to 18 or more carbon atoms, said radical being attached to an acylic oxygen atom of the dehydration product. They can be made by reacting hexitan or hexide or a mixture thereof, or hexitan or hexides containing at least one lipophilic radical, with an alkylene oxide such as ethylene oxide or propylene oxide in an amount sufficient to introduce a plurality of oxyalkylene groups into the molecule. For instance, the reaction may be carried out in a manner similar to that described in British Patent No. 443,559. In general, the alkylene oxide should be used in an amount sufficient to form an ether group or one of the oxygen atoms of the hydroxyl groups of the hexitan or hexide, and introduce at least two of the alkylene groups (—R—O— wherein R is an alkylene radical, e. g., ethylene, propylene, butylene, etc.). The alkylene oxide may, however, react with several of the hydroxyl groups of the hexitans or hexides and introduce several oxyalkylene chains. For example, one to four of the hydroxyl groups of the hexide may react and form a chain of oxyalkylene groups of 2 to 20 or more of such groups. Because of their commercial availability and excellent plasticizing action the polyoxyalkylene derivatives of sorbitol anhydride partial long chain fatty acid esters such as sorbitan monolaurate polyoxyalkylene derivative, sorbitan monopalmitate polyoxyalkylene derivative, sorbitan trioleate polyoxyalkylene derivative and particularly sorbitan mono-oleate polyoxyethylene derivative (Tween 80) are preferred for purposes of this invention.

In the manufacture of film, sheets and like pellicular structures formed by the conventional casting technique the plasticizer is most conveniently introduced in the film-forming or casting composition from which the pellicular structure is produced. It will be understood that the amount of plasticizer introduced may be varied within wide limits and will depend in each instance upon the particular polyoxyalkylene ether of a ring dehydration product of a hexitol employed and upon the degree of plasticization desired. In the preferred embodiment from about 5 to about 30% by weight of sorbitan mono-oleate polyoxyalkylene derivative, based on the weight of vinylidene chloride copolymer, should be used.

The plasticizers of this invention are effective with all organic solvent soluble vinylidene chloride copolymers. Such polymers include by way of example the copolymers of vinylidene chloride with acrylonitrile, with vinyl chloride, with vinyl acetate, with divinyl ether, with styrene, with acryl acrylates, with acryl esters of substituted acrylic acids, etc. However, because of their superior moistureproofness, heat sealability, and film-forming characteristics this invention is chiefly concerned with the plasticizing, the copolymers of vinylidene chloride with acrylonitrile and particularly methyl ethyl ketone-soluble copolymers of vinylidene chloride with acrylonitrile wherein the weight ratio of vinylidene chloride to acrylonitrile is at least 4:1, and the invention will be further described with specific reference to these copolymers.

The formation of pellicular structures from the plasticized vinylidene chloride copolymer may be accomplished by any of the usual methods such as solvent casting, emulsion casting, dipping, coating, etc. For most purposes a solution containing from 20–30% by weight of vinylidene chloride-acrylonitrile copolymer and from 1–9% by weight of a polyoxyalkylene ether of a hexitol ring dehydration product in a suitable solvent such as methyl ethyl ketone, cyclohexanone, dioxane, dioxolane, etc., provides a satisfactory film-forming composition.

The following examples, wherein are set forth preferred embodiments will further illustrate the principles and practice of this invention. Throughout the specification and claims, parts and percentages are by weight unless otherwise indicated.

Example I

Forty-five parts of vinylidene chloride-acrylonitrile (80:20) copolymer, 9 parts of Tween 80 (Sorbitan mono-oleate polyoxyethylene derivative marketed by Atlas Powder Co.) and 246 parts of methyl ethyl ketone were mixed at 55–60° C. for 4 hours to form a casting solution or dope. The dope was then allowed to rest at 60° C. until free of trapped air after which time it was cast on a polished plate of stainless steel which had been heated to 50° C. A casting knife with a .013" opening was used to cast the film on the plate. The plate temperature was maintained at 50° C. until the film was tack-free after which time the temperature was raised to 65° C. and maintained for 60 minutes to complete removal of solvent from the film. The resultant film was .001" thick, transparent and very flexible.

Example II

Forty-five parts of 80:20 vinylidene chloride-acrylonitrile copolymer, 225 parts of Tween 80, and 255 parts methyl ethyl ketone were mixed at 55–60° C. for 4 hours to form a clear lacquer. The lacquer, at room temperature, was then placed in a dip tank to provide a coating bath and through this bath was passed 450 gauge regenerated cellulose film at a rate of about 50 inches per minute. The film was then passed between a set of doctor knivers adjusted to give a total dried coating thickness of about .0001". The film was thereafter dried in air at a temperature of 100–120° C. for about one minute. The resultant coated film was clear and flexible.

Example III

A mixture consisting of:

| | Parts |
|---|---|
| Vinylidene chloride | 22.5 |
| Acrylonitrile | 2.5 |
| Tween 80 | 2.0 |
| Ammonium persulfate | 0.2 |
| Sodium bisulfite | 0.1 |
| Glycine | 0.2 |
| Darvan No. 1 (polymerized sodium salts of alkyl naphthalene sulfonic acids) | 0.75 |
| Water | 13.5 | was placed in a closed reaction vessel and was heated at 35° C., with constant lateral agitation for 18 hours. The resulting emulsions containing about 65% solids was directly cast, at room temperature, onto a glass casting plate and the plate was then heated (about 25 minutes) to a temperature of 80–100° C. to remove most of the water. The film was thereafter subjected to a temperature of 150° C. for about 5 minutes, cooled, and finally stripped from the casting plate. The sheet so obtained was both clear and flexible.

The outstanding advantage of this invention is, of course, the marked improvement in the flexibility and toughness of pellicular structures of vinylidene chloride copolymers which attends the use of the plasticizers herein disclosed. Another important advantage resides in the fact that, in addition to their plasticizing action, polyoxyalkylene ethers of hexitol ring dehydration products, produce clear, stable, relatively viscous emulsions of vinylidene chloride copolymers, which emulsions can be cast directly to form self-sustaining film, thus eliminating the need for expensive solvents and solvent recovery operations.

As many widely different embodiments and modifications can be made without departing from the spirit and scope of my invention, it is to be understood that this invention is not to be restricted in any way except as set forth in the appended claims.

I claim:

1. A pellicular structure comprising essentially an organic solvent soluble vinylidene chloride copolymer plasticized with a polyoxyalkylene ether of a ring dehydration product of a hexitol.

2. A pellicular structure comprising essentially an organic solvent soluble vinylidene chloride-acrylonitrile copolymer plasticized with a polyoxyalkylene ether of a ring dehydration product of hexitol.

3. A pellicular structure comprising essentially an organic solvent soluble vinylidene chloride-acrylonitrile copolymer having a vinylidene chloride to acrylonitrile ratio of at least 4:1, plasticized with a polyoxyalkylene ether of a ring dehydration product of a hexitol.

4. A pellicular structure comprising essentially an organic solvent soluble vinylidene chloride-acrylonitrile copolymer plasticized with from 5 to 30% by weight of sorbitan mono-oleate polyoxyethylene derivative.

5. The product of claim 4 wherein the vinylidene chloride copolymer is vinylidene chloride-acrylonitrile copolymer having a vinylidene chloride to acrylonitrile ratio of at least 4:1.

6. A film-forming composition consisting essentially of an organic solvent soluble vinylidene chloride copolymer and as plasticizer a polyoxyalkylene ether of a ring dehydration product of a hexitol, in an inert volatile liquid.

7. A film-forming composition consisting essentially of an aqueous emulsion of a vinylidene chloride-acrylonitrile copolymer having a vinylidene chloride to acrylonitrile ratio of about 9:1, and from 5 to 30% by weight, based on the weight of copolymer of sorbitan mono-oleate polyoxyethylene derivative.

8. The film-forming composition of claim 7 wherein the copolymer is vinylidene chloride-acrylonitrile copolymer having a vinylidene chloride to acrylonitrile ratio of at least 4:1.

ROBERT ALBERT SCHEIDERBAUER.

No references cited.